March 7, 1972 — L. B. FRITZINGER ET AL — 3,647,585

METHOD OF ELIMINATING PINHOLE SHORTS IN
AN AIR-ISOLATED CROSSOVER
Filed May 23, 1969

INVENTORS L. B. FRITZINGER
M. P. LEPSELTER
BY
ATTORNEY

United States Patent Office 3,647,585
Patented Mar. 7, 1972

3,647,585

METHOD OF ELIMINATING PINHOLE SHORTS IN AN AIR-ISOLATED CROSSOVER

Larry B. Fritzinger, Piscataway, and Martin P. Lepselter, New Providence, N.J., assignors to Bell Telephone Laboratories, Incorporated, Murray Hill, N.J.

Filed May 23, 1969, Ser. No. 827,215
Int. Cl. H01l 7/50; H05k 3/06
U.S. Cl. 156—17 4 Claims

ABSTRACT OF THE DISCLOSURE

Pinhole shorts are eliminated in an air-isolated crossover by including a compressively stressed layer in the upper conductor. When a filler material between the upper and lower conductors is etched away, the stressed layer will expand, causing the upper conductor to arch away from the lower conductor and breaking any pinhole shorts between the two conductors.

BACKGROUND OF THE INVENTION

This invention relates to a method for eliminating pinhole short circuits in thin-film crossovers.

An intensive effort to increase the reliability and performance of electronic products while reducing their size has led to a microelectronic technology that has shrunk circuit elements to dimensions almost invisible to the unaided eye. The microscopic dimensions of these new circuit elements has resulted in circuits that are rugged, long-lasting, low in cost and capable of performing electronic functions at extremely high speed (cf. Hittinger and Sparks, Microelectronics, Scientific American (November 1965) p. 57).

One problem which limits the minimum size of microelectronic circuits and elements is the phenomenon of "pinhole" short circuits. When a layer of metal is deposited on a thin film of insulating material, the metal often penetrates through tiny holes in the thin film and makes electrical contact with whatever lies under the thin film. When the underlying material is a conductor, the result is a direct short, termed a "pinhole" short. Since the probability of obtaining a pinhole short increases as the thickness of the film separating the two conductors decreases there is a practical limit to the minimum spacing which can be realized between two conducting layers. This limitation has at least two effects. First, it at least partially frustrates the goal of reducing the size of circuits by preventing any further reduction in the size of circuit elements. And, second, it limits the reliability of certain types of circuit elements such as thin film crossovers.

In U.S. Pat. No. 3,461,524, issued Aug. 19, 1969, to Martin P. Lepselter, assigned to applicants' assignee, there is disclosed a method for making thin-film crossovers comprising the steps of depositing a thin film of filler material between the upper and lower conductors, selectively etching away the filler material and then eliminating any exposed pinhole short circuits. Crossovers made in this manner will henceforth be referred to as air-isolated crossovers. The present invention is directed to a particularly advantageous way of eliminating the pinhole shorts in air-isolated crossovers.

BRIEF SUMMARY OF THE INVENTION

In accordance with the present invention, pinhole shorts are eliminated in air-isolated crossovers by including, as the upper conductor, a compressively stressed layer so that when the thin film of filler material between the upper and lower conductors is etched away, the stressed layer will expand causing the upper conductor to arch away from the lower conductor and break any pinhole shorts between the two conductors.

BRIEF DESCRIPTION OF THE DRAWINGS

The nature, features and various advantages of the invention will appear more fully upon consideration of the illustrative embodiment shown in the accompanying drawings and the following explanation.

In the drawings.

DETAILED DESCRIPTION

Figure 1:
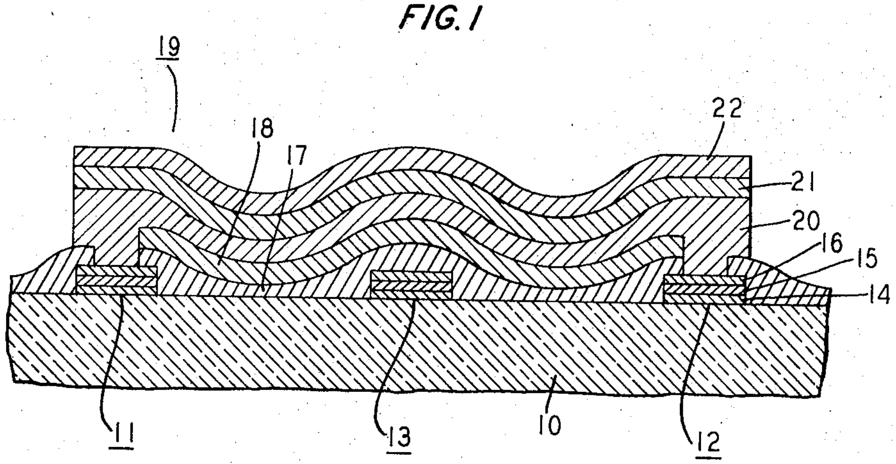
FIG. 1 is a schematic cross section of a typical structure used to make an air-isolated crossover in accordance with the invention.

Referring to FIG. 1 metal contacts 11 and 12, between which it is desired to provide an electrical connection crossing over an intermediate lower conductor 13, are shown disposed upon an insulating substrate 10, such as, for example, silicon with a layer of $SiO_2$ or $Si_3N_4$ on top. Advantageously, in accordance with present beam lead techniques, the contacts 11 and 12 and the intermediate conductor 13 are each composite structures comprising three films of different metals deposited one upon the other. The first film 14 is titanium to secure good adherence to the substrate 10, the third film 16 is gold for ease of bonding and the second film 15 is platinum to keep the gold and titanium from reacting. In addition, a layer 17 of an oxidizable metal such as zirconium which can be oxidized to form a dielectric layer is advantageously disposed upon the intermediate conductor 13. Typical thicknesses are as follows: titanium, 1500 angstroms; platinum, 3000 angstroms; gold, 20,000 to 30,000 angstroms and zirconium, 1500 angstroms.

On top of oxidizable layer 17 there is shown a spacing layer 18 of filler material such as, for example, 30,000 angstroms of copper.

An upper conducting layer 19, connecting contacts 11 and 12 is disposed on the spacing layer 18. Prior to its deposition, the spacing layer 18 and the oxidizable layer 17 are appropriately masked and etched so that the upper conductor 19 makes good electrical contact with contacts 11 and 12. The upper conducting layer, in accordance with the invention, includes a compressively stressed layer 21 such as rhodium. (The method for plating compressively stressed rhodium is well known in the art and commercially prepared plating solutions are readily available. A typical plating technique, useful in fabricating the invention is to plate a solution containing 10 to 20 grams of rhodium sulfate per liter and 20 cubic centimeters of concentrated sulfuric acid per liter with a current of 50 amps per square foot at 50° C.) Advantageously the conductor is a composite structure also including layers of soft metal having good conductivity. For example, the upper conductor can be a composite structure comprising a lower portion 20 of about 40,000 angstroms of soft gold disposed on spacing layer 18, an intermediate stressed layer 21 of about 20,000 angstroms of rhodium, and an upper portion 22 of 40,000 angstroms of gold.

Figure 2:
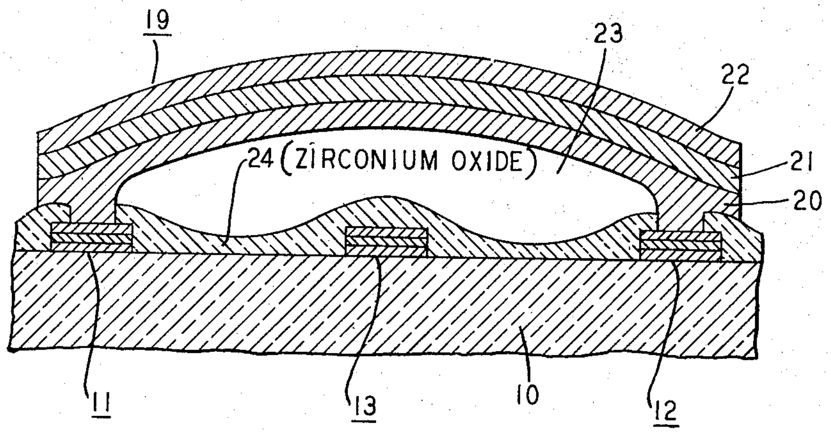
FIG. 2 is a cross section of a completed crossover fabricated in accordance with the invention.

A pinhole-short-free, air-isolated crossover is made from this illustrated structure by selectively etching away the spacing layer 18 with an etchant which does not significantly affect the other metals. For example, the copper spacing layer illustrated can be etched away in concentrated ferric nitrate in about 10 minutes. Once the spacing layer is etched away, the stressed layer will force the upper conductive layer to arch away from the lower conductor, since nothing holds the conductive layer down except the end contacts. This arching results in the breaking of any pinhole shorts between the upper and lower conductors and strong mechanical structure unlikely to be deformed in such a manner that the upper and lower conductors come into contact. Additional protection is obtained by oxidizing the zirconium layer to form a protective dielectric film over the lower conductor. This can be accomplished by heating the structure to about 350° C. for 5 to 8 hours. The completed structure, showing the arched upper conductor, the newly formed air gap 23 and protective layer 24 of zirconium oxide, is shown in FIG. 2.

What is claimed is:

1. A method for forming an air-isolated thin-film metal crossover between separate conductors separated by an intermediate metal conductor comprising the steps of:

depositing a spacing layer of a thin film of metal filler material on top of the intermediate conductive metal layer;

forming on top of the filler layer a conductive metal crossover that is electrically and mechanically coupled to each of the separated conductors; and selectively etching away the spacing layer to leave an insulating gap between the crossover and the intermediate conductor;

the invention characterized in that the conductive crossover is deposited on the spacing layer in a compressively prestressed condition so that when the spacing layer is etched away the conductive metal crossover expands away from the intermediate conductor forming an arch with an insulating air gap between the conductive crossover and the intermediate conductor.

2. The method according to claim 1 including the steps of disposing an oxidizable metal between the spacing layer and either the upper conductive crossover or the intermediate conductor and after etching away said spacing layer, oxidizing said metal to form a protective dielectric layer between the two conductors.

3. The method according to claim 2 wherein:

said intermediate conductor is a composite structure including films of titanium, platinum and gold;

said spacing layer of filler material is copper;

said oxidizable metal layer is zirconium;

and said conductive crossover is a composite layer including a layer of gold and a layer of compressively stressed rhodium.

4. The method of claim 1 wherein the conductive crossover is deposited by electroplating.

References Cited

UNITED STATES PATENTS 3,461,524 8/1969 Lepselter ---------- 29—25.42

JACOB H. STEINBERG, Primary Examiner

U.S. Cl. X.R.

29—581; 156—3; 174—68.5; 204—40; 317—234